(No Model.)

S. BURDSALL.
FIFTH WHEEL.

No. 358,428. Patented Mar. 1, 1887.

Witness,
M. G. Anton.
R. M. Lee.

Inventor,
Stephen Burdsall,
per Geo. W. Tibbitts atty

UNITED STATES PATENT OFFICE.

STEPHEN BURDSALL, OF FREMONT, OHIO, ASSIGNOR TO THE HERBRAND COMPANY, OF SAME PLACE.

FIFTH-WHEEL.

SPECIFICATION forming part of Letters Patent No. 358,428, dated March 1, 1887.

Application filed October 25, 1886. Serial No. 217,093. (No model.)

*To all whom it may concern:*

Be it known that I, STEPHEN BURDSALL, of Fremont, in the county of Sandusky and State of Ohio, have invented certain new and useful Improvements in Gear-Irons for Vehicles, of which the following is a specification.

These improvements relate to gear irons for carriages or wagons; and they consist in the peculiar construction and combination of parts pertaining to the fifth-wheel, as hereinafter described, and pointed out in the claims.

Figure 1:
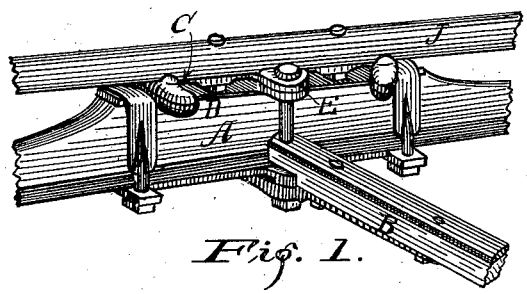
Figure 2:
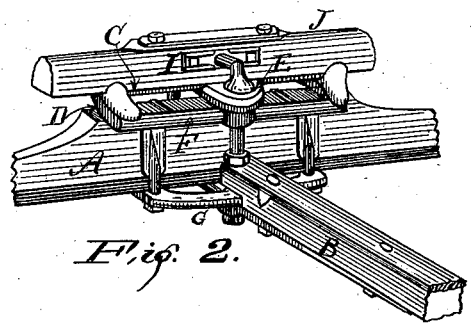
Figure 3:
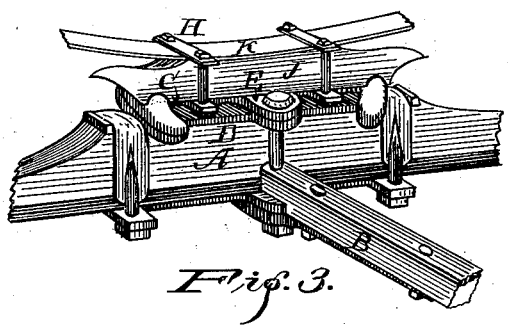
Figure 4:
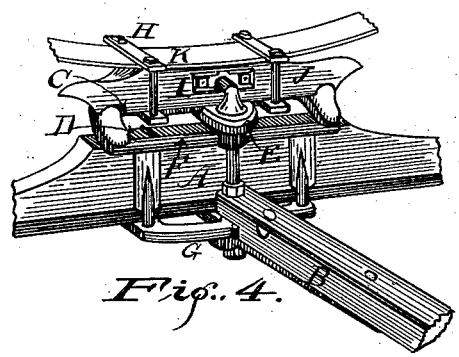
Figure 5:
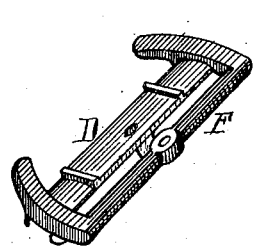
Figure 6:
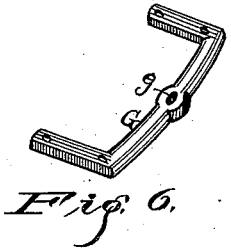

In accompanying drawings, Figures 1, 2, 3, and 4 are perspective views of fifth-wheel gear embodying my improvements. Fig. 5 is a detached view of a new lower fifth-wheel plate. Fig. 6 is a detached view of the bottom axle-plate.

A is an axle, and B is the reach. These two parts of a vehicle are united by means of a mechanism comprising a fifth-wheel having the king-bolt in rear of the axle, which was the subject of Patent No. 277,725, May 15, 1883. In said patent it will be observed that the top plate of the fifth-wheel has a rear projecting brace-iron. In my present application I dispense with said brace-iron, and I make the top plate of the fifth-wheel with a middle rear projection having an eye for the king-bolt, like the lower plate, or I make it with a parallel bar connecting the rear projections with the said middle projection.

C is the upper fifth-wheel plate, and D is the lower one. E is middle projection, and F is the parallel bar.

The bottom axle-plate I make in the form seen in Fig. 6, consisting of a bar, G, having a swell at its middle part provided with an eye, g, for the king-bolt, its ends having arms pierced with holes for the clips H. I also make the top end of the king-bolt with an extension and elbow terminating with a T-plate, I, which is bolted to the bolster J, which serves to brace and stiffen the support of the bolster, and the bolster and spring K may be secured with bolts passing through them, or, preferably, with clips, as seen in Figs. 3 and 4.

Having described my invention, what I claim, and desire to secure by Letters Patent, is—

1. In running-gear for vehicles, the combination, with the axle, reach, bolster or head-block, and king-bolt located in rear of the axle, of the fifth-wheel plates C D, plate C having rearwardly-projecting arm through which the king-bolt passes, and each plate provided with segmental sub-irons extending in front and rear, those on rear of plate D having the parallel uniting-bar F integral therewith, and provided with eye at central part for the king-bolt, and the lower bar, G, having end arms pierced to receive the bolts of the clips H H, and eye at the middle for the king-bolt, all constructed and operating substantially as described.

2. In running-gear for vehicles, the combination, with the axle, reach, bolster or head-block, and king-bolt located in rear of the axle, of the fifth-wheel plates C D, plate C having rearwardly-projecting arm through which the king-bolt passes, the bolt having the elbow on its head provided with a T-arm, I, for securing it to the bolster or head-block, each of said plates C D provided with segmental sub-irons extending in front and rear, those on rear of plate D having the parallel uniting-bar F integral therewith, and provided with eye at central part for the king-bolt, and a lower bar, G, having end arms pierced to receive the bolts of the clips H H, and an eye at the middle for the king-bolt, all constructed and arranged substantially as described.

STEPHEN BURDSALL.

Witnesses:
CHAS. THOMPSON,
F. S. THOMPSON.